(12) United States Patent
Campbell et al.

(10) Patent No.: US 10,744,601 B2
(45) Date of Patent: Aug. 18, 2020

(54) BONDED BRAZING RING SYSTEM AND METHOD FOR ADHERING A BRAZING RING TO A TUBE

(71) Applicant: Bellman-Melcor Development, LLC, Tinley Park, IL (US)

(72) Inventors: Steven Campbell, Mokena, IL (US); John Scott, New Lenox, IL (US)

(73) Assignee: BELLMAN-MELCOR DEVELOPMENT, LLC, Tinley Park, IL (US)

( * ) Notice: Subject to any disclaimer, the term of this patent is extended or adjusted under 35 U.S.C. 154(b) by 354 days.

(21) Appl. No.: 15/225,293

(22) Filed: Aug. 1, 2016

(65) Prior Publication Data

US 2017/0036306 A1    Feb. 9, 2017

Related U.S. Application Data

(60) Provisional application No. 62/202,457, filed on Aug. 7, 2015.

(51) Int. Cl.
*B23K 35/02* (2006.01)
*F16L 43/00* (2006.01)
*B23K 1/20* (2006.01)
*F16L 13/08* (2006.01)
*B23K 101/06* (2006.01)

(52) U.S. Cl.
CPC .......... *B23K 35/0222* (2013.01); *B23K 1/203* (2013.01); *B23K 35/0227* (2013.01); *F16L 13/08* (2013.01); *F16L 43/005* (2013.01); *B23K 2101/06* (2018.08)

(58) Field of Classification Search
CPC ................ B23K 35/0222; B23K 1/203; B23K 2101/06; F16L 13/08; F16L 43/005
See application file for complete search history.

(56) References Cited

U.S. PATENT DOCUMENTS

| | | |
|---|---|---|
| 400,869 A | 4/1889 | Norton et al. |
| 607,504 A | 7/1898 | Crowther |
| 1,650,905 A | 12/1925 | Mills |
| 1,629,748 A | 5/1927 | Stoody |
| 1,865,169 A | 7/1927 | Candy |
| 1,968,618 A | 2/1932 | Padgett et al. |
| 1,972,315 A | 9/1934 | Ramey |

(Continued)

FOREIGN PATENT DOCUMENTS

| | | |
|---|---|---|
| AU | 45936179 A | 7/1980 |
| BE | 878006 | 1/1980 |

(Continued)

OTHER PUBLICATIONS

European Search Report dated Jun. 22, 2012 for PCT/US2006/043856.

(Continued)

*Primary Examiner* — Christopher T Schatz
(74) *Attorney, Agent, or Firm* — Vorys, Sater, Seymour and Pease LLP; Rex W. Miller, II

(57) ABSTRACT

A bonded brazing ring secured to an end of a tube having a solvent or a solvent with a binder applied to the surface of the tube, and a method of adhering a brazing ring to a tube using a solvent or a solvent with a binder is provided. The brazing ring is secured to the tube prior to a brazing operation.

9 Claims, 3 Drawing Sheets

(56) References Cited

U.S. PATENT DOCUMENTS

| | | | |
|---|---|---|---|
| 2,005,189 A | 6/1935 | Herr |
| 2,055,276 A | 9/1936 | Brownsdon et al. |
| 2,279,284 A | 4/1942 | Wassermann |
| 2,334,609 A | 11/1943 | Cox |
| 2,442,087 A | 5/1948 | Kennedy |
| 2,465,503 A | 3/1949 | Woods |
| 2,499,641 A | 3/1950 | Goody |
| 2,565,477 A | 8/1951 | Crowell et al. |
| 2,785,285 A | 3/1957 | Bernard |
| 2,845,700 A | 8/1958 | Bagno |
| 2,927,043 A | 3/1960 | Stetson |
| 2,958,941 A | 11/1960 | Goerg |
| 3,033,713 A | 5/1962 | Bielenberg et al. |
| 3,051,822 A | 8/1962 | Bernard et al. |
| 3,077,131 A | 2/1963 | McShane |
| 3,162,551 A | 12/1964 | Short |
| 3,198,560 A | 8/1965 | Collins |
| 3,239,125 A | 3/1966 | Sherlock |
| 3,245,141 A | 4/1966 | Gruetjen |
| 3,290,772 A | 12/1966 | Crouch |
| 3,318,729 A | 5/1967 | Siegle et al. |
| 3,365,565 A | 1/1968 | Claussen |
| 3,452,419 A | 7/1969 | Hillert |
| 3,534,390 A | 10/1970 | Wood et al. |
| 3,542,998 A | 11/1970 | Huff |
| 3,555,240 A | 1/1971 | Gloor et al. |
| 3,558,851 A | 1/1971 | Takeshi |
| 3,610,663 A | 10/1971 | Lago |
| 3,619,429 A | 11/1971 | Torigai et al. |
| 3,620,830 A | 11/1971 | Kramer |
| 3,620,869 A | 11/1971 | Stump et al. |
| 3,639,721 A | 2/1972 | Hubbel |
| 3,642,998 A | 2/1972 | Jennings |
| 3,688,967 A | 9/1972 | Arikawa et al. |
| 3,695,795 A | 10/1972 | Jossick |
| 3,703,254 A | 11/1972 | Maierson et al. |
| 3,745,644 A | 7/1973 | Moyer et al. |
| 3,935,414 A | 1/1976 | Ballass et al. |
| 3,967,036 A | 6/1976 | Sadowski |
| 3,980,859 A | 9/1976 | Leonard |
| 4,041,274 A | 8/1977 | Sadowski |
| 4,121,750 A | 10/1978 | Schoer et al. |
| 4,134,196 A | 1/1979 | Yamaji et al. |
| 4,174,962 A | 11/1979 | Frantzreb, Sr. et al. |
| 4,214,145 A | 7/1980 | Zvanut et al. |
| 4,301,211 A | 11/1981 | Sloboda |
| 4,379,811 A | 4/1983 | Puschner et al. |
| 4,396,822 A | 8/1983 | Kishida et al. |
| 4,430,122 A | 2/1984 | Pauga |
| 4,447,472 A | 5/1984 | Minnick et al. |
| 4,493,738 A | 1/1985 | Collier et al. |
| 4,497,849 A | 2/1985 | Hughes et al. |
| 4,571,352 A | 2/1986 | Aoki |
| 4,587,097 A | 5/1986 | Rabinkin et al. |
| 4,587,726 A | 5/1986 | Holmgren |
| 4,624,860 A | 11/1986 | Alber et al. |
| 4,708,897 A | 11/1987 | Douchy |
| 4,762,674 A | 8/1988 | Cheng et al. |
| 4,785,029 A | 11/1988 | Honma et al. |
| 4,785,092 A | 11/1988 | Nanba et al. |
| 4,800,131 A | 1/1989 | Marshall et al. |
| 4,831,701 A | 5/1989 | Yutaka |
| 4,900,895 A | 2/1990 | Marshall |
| 4,901,909 A | 2/1990 | George |
| 4,993,054 A | 2/1991 | Ujari |
| 5,098,010 A | 3/1992 | Carmichael et al. |
| 5,175,411 A | 12/1992 | Barber |
| 5,184,767 A | 2/1993 | Estes |
| 5,219,425 A | 6/1993 | Nishikawa et al. |
| 5,280,971 A | 1/1994 | Tokutake et al. |
| 5,316,206 A | 5/1994 | Syslak et al. |
| 5,360,158 A | 11/1994 | Conn et al. |
| 5,418,072 A | 5/1995 | Baldantoni et al. |
| 5,575,933 A | 11/1996 | Ni |
| 5,749,971 A | 5/1998 | Ni |
| 5,759,707 A | 6/1998 | Belt et al. |
| 5,781,846 A | 7/1998 | Jossick |
| 5,791,005 A | 8/1998 | Grabowski et al. |
| 5,806,752 A | 9/1998 | Van Evans et al. |
| 5,820,939 A | 10/1998 | Popoola et al. |
| 5,903,814 A | 5/1999 | Miura et al. |
| 5,917,141 A | 6/1999 | Naquin |
| 6,093,761 A | 7/2000 | Schofalvi |
| 6,186,390 B1 | 2/2001 | Tadauchi et al. |
| 6,204,316 B1 | 3/2001 | Schofalvi |
| 6,244,397 B1 | 6/2001 | Kars |
| 6,248,860 B1 | 6/2001 | Sant'Angelo et al. |
| 6,264,062 B1 | 7/2001 | Lack et al. |
| 6,277,210 B1 | 8/2001 | Schuster |
| 6,317,913 B1 | 11/2001 | Kilmer et al. |
| 6,344,237 B1 | 2/2002 | Kilmer et al. |
| 6,376,585 B1 | 4/2002 | Schofalvi et al. |
| 6,395,223 B1 | 5/2002 | Schuster et al. |
| 6,409,074 B1 | 6/2002 | Katoh et al. |
| 6,417,489 B1 | 7/2002 | Blankenship et al. |
| 6,426,483 B1 | 7/2002 | Blankenship et al. |
| 6,432,221 B1 | 8/2002 | Seseke-Koyro et al. |
| 6,497,770 B2 | 12/2002 | Watsuji et al. |
| 6,598,782 B2 | 7/2003 | Wieres et al. |
| 6,608,286 B2 | 8/2003 | Jiang |
| 6,680,359 B2 | 1/2004 | Schoenheider |
| 6,713,593 B2 | 3/2004 | Ree et al. |
| 6,733,598 B2 | 5/2004 | Swidersky et al. |
| 6,830,632 B1 | 12/2004 | Fuerstenau et al. |
| 6,846,862 B2 | 1/2005 | Schofalvi et al. |
| 6,864,346 B2 | 3/2005 | Schoenheider |
| 6,872,465 B2 | 3/2005 | Soga et al. |
| 6,881,278 B2 | 4/2005 | Amita et al. |
| 6,960,260 B2 | 11/2005 | Goto |
| 7,022,415 B2 | 4/2006 | Schnittgrund |
| 7,267,187 B2 | 9/2007 | Kembaiyan |
| 7,337,941 B2 | 3/2008 | Scott et al. |
| 7,442,877 B2 | 10/2008 | Kamata et al. |
| 7,858,204 B2 | 12/2010 | Campbell et al. |
| RE42,329 E | 5/2011 | Fuerstenau et al. |
| 8,274,014 B2 | 9/2012 | Campbell et al. |
| RE44,343 E | 7/2013 | Fuerstenau et al. |
| 8,507,833 B2 | 8/2013 | Belohlav |
| 8,740,041 B2 | 6/2014 | Visser et al. |
| 9,095,937 B2 | 8/2015 | Campbell et al. |
| 2002/0020468 A1 | 2/2002 | Schuster et al. |
| 2003/0141350 A1 | 7/2003 | Noro et al. |
| 2003/0203137 A1 | 10/2003 | Teshima et al. |
| 2004/0009358 A1* | 1/2004 | Scott ............ B23K 35/0233 428/469 |
| 2004/0171721 A1 | 9/2004 | Esemplare |
| 2005/0051598 A1 | 3/2005 | Heminway et al. |
| 2005/0089440 A1 | 4/2005 | Kembaiyan |
| 2007/0093574 A1 | 4/2007 | Esemplare |
| 2007/0251602 A1 | 11/2007 | Gagnon, Jr. et al. |
| 2008/0017696 A1 | 1/2008 | Urech et al. |
| 2009/0014093 A1 | 1/2009 | Campbell et al. |
| 2009/0020276 A1 | 1/2009 | Ueda et al. |
| 2009/0077736 A1 | 3/2009 | Loberger et al. |
| 2009/0101238 A1 | 4/2009 | Jossick et al. |
| 2009/0200363 A1 | 8/2009 | Means et al. |
| 2009/0261574 A1 | 10/2009 | Blueml et al. |
| 2010/0122997 A1 | 5/2010 | Liu |
| 2010/0219231 A1 | 9/2010 | Means et al. |
| 2011/0023319 A1 | 2/2011 | Fukaya et al. |
| 2011/0089222 A1 | 4/2011 | Campbell et al. |
| 2011/0123824 A1 | 5/2011 | Belohlav et al. |
| 2012/0207643 A1 | 8/2012 | Belohlav et al. |
| 2013/0017393 A1 | 1/2013 | Campbell et al. |
| 2014/0008416 A1 | 1/2014 | Vasser et al. |
| 2016/0008929 A1 | 1/2016 | Campbell |
| 2016/0067833 A1 | 3/2016 | Campbell et al. |

FOREIGN PATENT DOCUMENTS

| | | |
|---|---|---|
| CA | 1146025 A | 5/1983 |
| CA | 1303605 A | 6/1992 |
| CN | ZL 200780027486.6 | 8/2012 |
| DE | 1298967 B | 7/1969 |

(56) References Cited

FOREIGN PATENT DOCUMENTS

| | | | |
|---|---|---|---|
| DE | 2522589 A1 | 12/1975 |
| DE | 2931040 A1 | 2/1980 |
| DE | 8910519 U1 | 10/1989 |
| DE | 60120250 T2 | 4/2007 |
| DK | 323379 | 2/1980 |
| EP | 0991697 | 4/2000 |
| EP | 1127653 A2 | 8/2001 |
| ES | 483021 A1 | 4/1980 |
| FR | 2349392 | 11/1977 |
| FR | 2432360 | 2/1980 |
| GB | 692710 A | 6/1953 |
| GB | 1180735 A | 2/1970 |
| GB | 1481140 A | 7/1977 |
| GB | 2027617 A | 2/1980 |
| IE | 48459 | 1/1985 |
| IN | 152853 | 4/1984 |
| IT | 1193704 | 8/1988 |
| JP | 55045591 A | 3/1980 |
| JP | 58000375 A | 1/1983 |
| JP | 62034698 A | 2/1987 |
| JP | 63040697 A | 2/1988 |
| JP | 63303694 A | 12/1988 |
| JP | 01066093 A | 3/1989 |
| JP | 2179384 A | 7/1990 |
| JP | 3005094 A | 1/1991 |
| JP | 3204169 A | 9/1991 |
| JP | 4371392 A | 12/1992 |
| JP | 6007987 A | 1/1994 |
| JP | 11347783 A | 12/1999 |
| JP | 2005512655 A | 4/2002 |
| MX | 302328 | 8/2012 |
| NL | 7905877 | 2/1980 |
| NO | 792504 A | 2/1980 |
| SE | 7906495 A | 2/1980 |
| WO | 1999/000444 A1 | 1/1999 |
| WO | 2000039172 A1 | 7/2000 |
| WO | 2000052228 A1 | 9/2000 |
| WO | 2000064626 | 11/2000 |
| WO | 2002000569 | 1/2002 |
| WO | 2002031023 | 4/2002 |
| WO | 2003068447 | 8/2003 |
| WO | 2003089176 | 10/2003 |
| WO | 2004061871 | 7/2004 |
| WO | 2004094328 | 11/2004 |
| WO | 2007058969 A2 | 5/2007 |
| WO | 2007058969 A3 | 5/2007 |
| WO | 2007140236 A1 | 12/2007 |
| WO | 2008148088 A1 | 12/2008 |
| WO | 2016007271 A1 | 1/2016 |
| ZA | 7903893 A | 7/1980 |

OTHER PUBLICATIONS

Examination Report of SIPO for CN 2007800274866 dated Dec. 17, 2010.
Extended European Search Report for EP 07762314.8 dated Dec. 13, 2012.
International Preliminary Report on Patentability for PCT/US2008/064871 dated Dec. 1, 2009.
International Preliminary Report on Patentability for PCT/US2007/069636 dated Dec. 11, 2008.
International Preliminary Report on Patentability for PCT/US2006/043856 dated Nov. 9, 2006.
International Preliminary Report on Patentability for PCT/US2007/025309 dated Jun. 16, 2009.
International Search Report for PCT/US2008/064871 dated Dec. 4, 2008.
International Search Report for PCT/US2007/069636 dated Nov. 8, 2007.
International Search Report for PCT/US2007/025309 dated Apr. 9, 2008.
International Search Report for PCT/US2006/043856 dated Dec. 21, 2007.
Written Opinion of International Searching Authority for PCT/US2006/043856 dated May 10, 2008.
Written Opinion of International Searching Authority for PCT/US2007/069636 dated May 24, 2007.
Written Opinion of International Searching Authority for PCT/US2007/025309 dated Dec. 11, 2007.
Written Opinion of International Searching Authority for PCT/US2008/064871 dated Nov. 25, 2009.
Belohlav, A.; "Understanding Brazing Fundamentals"; The American Welder, Sep.-Oct. 2000; Jul. 1, 2008; retrieved from <http://www.aws.org/wj/amwelder/9-00/fundamentals.html>.
Omni Technologies Corporation; "SIL-CORE Product Catalog"; undated (6 pages).
Day, S.A.; Material Safety Data Sheet for "Aluminum Flux Cored Wire and Rings"; pp. 1-5; Feb. 23, 2004 (5 pages).
Day, S.A.; Material Safety Data Sheet for "Flux Coating Part 'A'"; pp. 1-6; May 2, 2006 (6 pages).
Day, S.A.; Material Safety Data Sheet for "Flux Coating Part 'B'"; pp. 1-3; May 2, 2006 (3 pages).
US Patent Office, International Search Report and Written Opinion of International Searching Authority for PCT/US2015/036606 dated Nov. 24, 2015 (11 pages).
European Patent Office, Examination Report for EP Application No. 07762314.8 dated Mar. 24, 2016 (6 pages).

* cited by examiner

US 10,744,601 B2

BONDED BRAZING RING SYSTEM AND METHOD FOR ADHERING A BRAZING RING TO A TUBE

CROSS-REFERENCE TO RELATED APPLICATIONS

The present invention claims the benefit of U.S. Provisional Patent Application Ser. No. 62/202,457 filed Aug. 7, 2015, the contents of which are incorporated herein by reference.

FEDERALLY SPONSORED RESEARCH OR DEVELOPMENT

N/A

FIELD OF THE INVENTION

The present invention generally relates to a bonded brazing ring system and a method for adhering the brazing ring to a tube so that the ring does not fall off the tube prior to a brazing operation.

BACKGROUND OF THE INVENTION

Return bends and other tubing for industrial use (e.g., automotive, air conditioning and refrigerating systems) are typically connected to other components of a system in a brazing operation. A brazing material—typically in the form of a ring having an open end with a small gap—is melted where the bend or tube connects to the system to provide a sealed joint. A flux is typically utilized in this operation and can be held by the brazing material.

Brazing rings are typically loaded onto return bends prior to transit of the return bends to the system. The brazing rings are formed having a smaller diameter than the ends of the return bends and thus are slightly expanded when placed on the ends. While this expansion provides a mechanical mechanism (e.g., tension) for holding onto the ends of the return bend, other factors, such as time, environmental conditions, jarring during transit, etc. can cause the tension holding the brazing rings to soften and allow the rings to fall off.

The present invention provides an improved brazing ring system and method of placing the brazing ring on the return bend to avoid loss during transit.

SUMMARY OF THE INVENTION

The present invention provides a brazing ring that is adhered to a return bend or other similar tubing prior to a brazing operation, and a method for adhering the brazing ring to the bend or other tubing. This allows for safe transport of the return bend loaded with brazing rings without concern that the brazing rings will fall off during transit.

In accordance with one embodiment of the invention, a secured brazing ring system is provided. The system comprises a tube having a first end portion. A first brazing ring having a brazing material and a channel of flux with an exposed surface is secured about the first end portion of the tube. The exposed surface of flux faces an outer surface of the first end of the tube. A layer of a solvent or a solvent with a binder is interposed between the outer surface of the first end portion of the tube and the exposed surface of flux. The solvent or solvent with binder acts to adhere the brazing ring to the end of the tube.

The solvent can be, for example, acetone. Acetone causes a binder in the exposed flux to partially activate and adhere to the end portion of the tube.

The tube can be part of a return bend. The return bend includes a second end portion. Accordingly, a second brazing ring having a brazing material and a channel of flux with an exposed surface can be secured about the second end portion of the tube. Similar to the first brazing ring, the exposed surface of flux faces an outer surface of the second end portion of the tube and a layer of solvent or a solvent with a binder is interposed between the outer surface of the second end portion of the tube and the exposed surface of flux. Again, the solvent can be acetone.

In accordance with another embodiment of the invention, a method of adhering a brazing ring to a tube is provided. The method comprises providing a tube having a first end, applying a layer of a solvent or a solvent with a binder to the first end, and loading a first brazing ring on the first end having a channel of flux exposed toward an outer surface of the first end.

The solvent can be, for example, acetone. In this instance, the exposed flux partially activates upon contact with the acetone to adhere the brazing ring to the first end of the tube.

The method can further include providing a second end of the tube, applying a layer of a solvent or a solvent with a binder to the second end, and loading a second brazing ring on the second end having a channel of flux exposed toward an outer surface of the second end.

Again, the solvent can be acetone. In this instance, the exposed flux partially activates upon contact with the acetone to adhere the brazing ring to the second end of the tube.

In accordance with another embodiment of the invention another embodiment of the invention a method of adhering a brazing ring to a tube comprises providing a tube having a first end, loading a first brazing ring on the first end of the tube having a channel of flux exposed toward an outer surface of the first end of the tube and causing a binder in the exposed flux of the first brazing ring to partially activate and adhere to the outer surface of the first end of the tube.

The step of causing a binder in the exposed flux of the first brazing ring to partially activate and adhere to the outer surface of the first end of the tube can be accomplished by applying a solvent, such as acetone, or a solvent with a binder. This method can also be applied to a second end of the tube.

Further aspects of the invention are disclosed in the Figures, and are described herein.

BRIEF DESCRIPTION OF THE DRAWINGS

To understand the present invention, it will now be described by way of example, with reference to the accompanying drawings and attachments in which.

DETAILED DESCRIPTION

Figure 1:
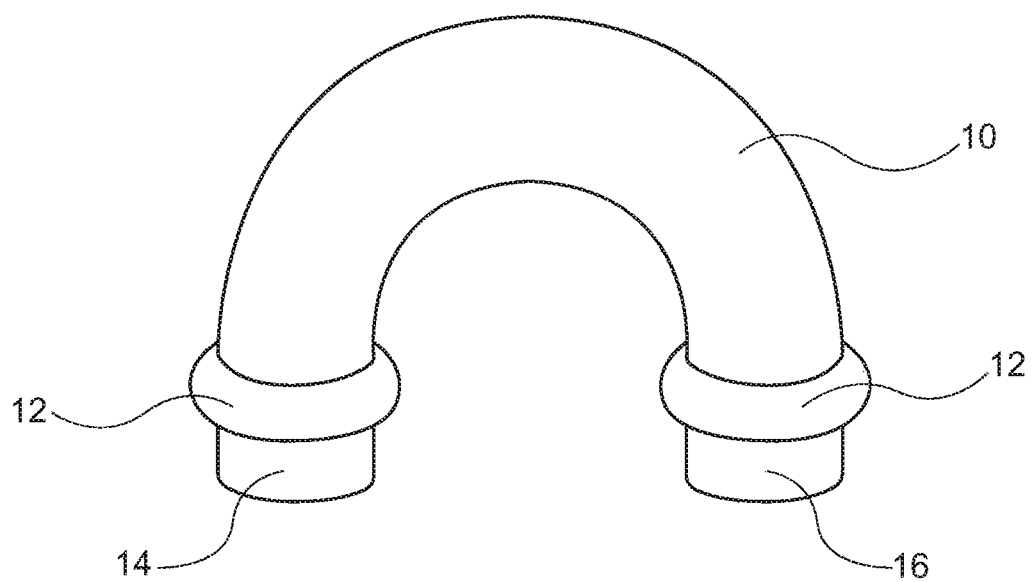
FIG. 1 is a perspective view of a first and second brazing ring on the ends of a return bend.

While this invention is susceptible of embodiments in many different forms, there is shown in the drawings, and will herein be described in detail preferred embodiments of the invention with the understanding that the present disclosure is to be considered as an exemplification of the principles of the invention and is not intended to limit the broad aspect of the invention to the embodiments illustrated.

The present invention is directed to a brazing ring that adheres to a tube, such as an end of a return bend during transit (i.e., prior to a brazing operation), and to a method for adhering the brazing ring to the return bend.

FIG. 1 shows a typical return bend 10 (i.e., a bend that connects to two parallel tubes of a system, such as an air conditioning system), with a first brazing ring 12 on a first end 14 of one leg of the return bend 10, and a second brazing ring 12 on a second end 16 of the other leg of the return bend 10. As discussed below, the brazing rings 12 are adhered to the ends 14, 16 of the return bend 10 so that they do not fall off during transit.

Figure 2:
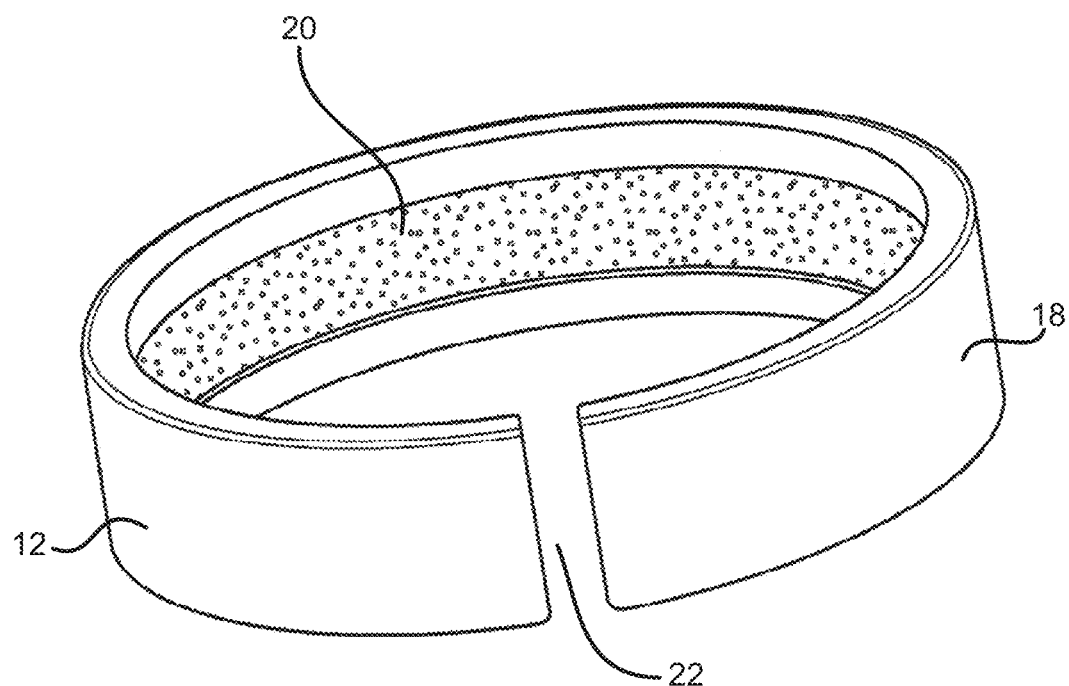
FIG. 2 is a perspective view of a brazing ring used in FIG. 1.
Figure 3:
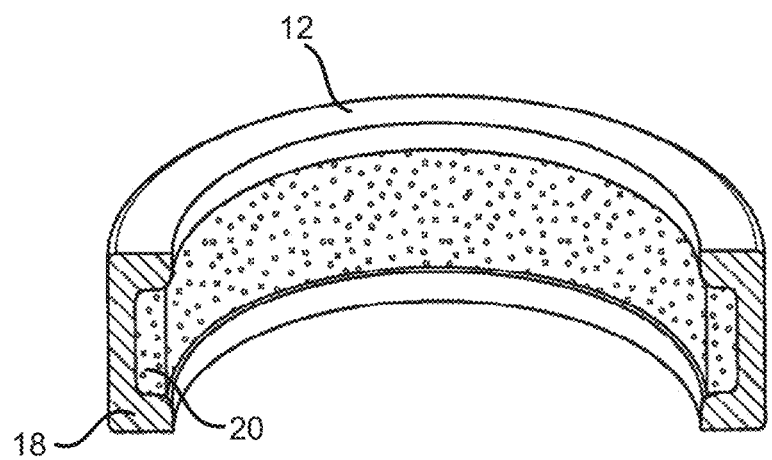
FIG. 3 is a cross-sectional view of the brazing ring of FIG. 2.

As illustrated in FIGS. 2 and 3, each brazing ring 12 includes an outer layer of brazing material 18 surrounding a channel of flux material 20. The top surface of the flux material 20 in the channel is exposed. Referring back to FIG. 1, it is clear that the exposed flux material 20 is in contact with the outer wall or surface of the ends 14, 16 of the return bend 10 (this is also evident in the cross-sectional view of FIG. 4).

The brazing ring 12 is formed from a wire of material bent into a circular shape. This leaves a slight opening 22 between the ends of the ring 12. A brazing ring of the type disclosed in U.S. Pat. No. 9,095,937 (which is incorporated herein by reference) can be utilized in this embodiment of the invention.

To adhere the brazing rings 12 to the return bend 10, a solvent 26, preferably acetone, is applied to the ends of the return bend 10. This can be accomplished by painting or spaying the acetone 26 onto the return bend 10 prior to loading the brazing rings 12 onto the ends of the return bend 10. The brazing rings 12 are then loaded to the return bend 10 and the applied acetone reacts to the exposed flux 20. This reaction slightly activates a binder in the flux 20 which acts like a very effective glue that causes the brazing rings 12 to adhere to the ends 14, 16 of the return bend 10. This adherence allows for transit of the return bend 10 without risk of losing the brazing rings 12.

Figure 4:
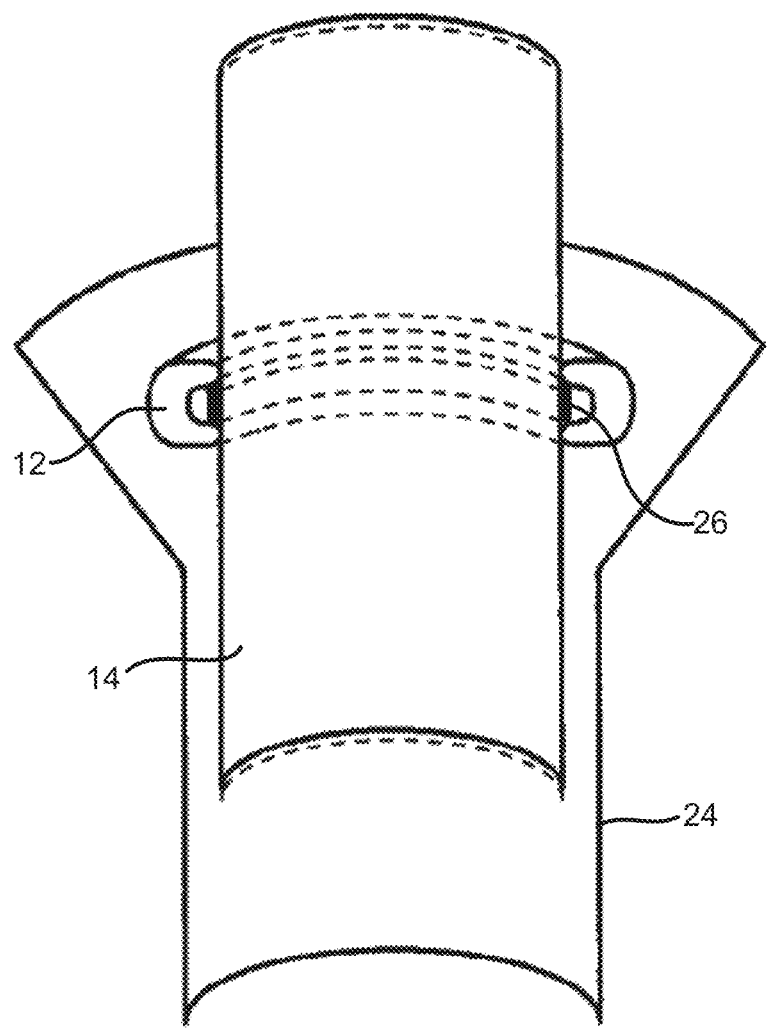
FIG. 4 is a partial cross-sectional view of the brazing ring around the end of one leg of a return bend positioned in a receiving tube prior to a brazing operation.

As illustrated in FIG. 4, the ends 14, 16 (only one end 14 is shown) of the return bend 10 are positioned in a receiving tube 24 (e.g., of an air conditioning system). They can then be subjected to a brazing operation.

While acetone is preferred, other materials, such as another solvent or a solvent with binder may also be used. Additionally, other brazing structures can be used with this invention. Moreover, the tubes and corresponding brazing rings do not have to be circular or round in cross-section, but can also be other geometric shapes.

Many modifications and variations of the present invention are possible in light of the above teachings. It is, therefore, to be understood within the scope of the appended claims the invention may be protected otherwise than as specifically described.

We claim:

1. A method of adhering a brazing ring to a tube comprising:
    providing a tube having a first end;
    loading a first brazing ring on the first end of the tube having a channel of flux exposed toward an outer surface of the first end of the tube;
    causing a binder in the exposed flux of the first brazing ring to partially activate and adhere to the outer surface of the first end of the tube,
    transporting the tube and the first brazing ring after causing the binder in the exposed flux of the first brazing ring to partially activate and adhere to the outer surface of the first end of the tube; and,
    heating the brazing ring to a temperature sufficient to allow the flux to melt and flow out of the first brazing ring after transporting the tube and the first brazing ring.

2. The method of claim 1 wherein the step of causing the binder in the exposed flux of the first brazing ring to partially activate and adhere to the outer surface of the first end of the tube comprises:
    applying a first layer of a solvent to the first end of the tube.

3. The method of claim 2 wherein the step of applying a first layer of a solvent to the first end of the tube comprises:
    applying acetone to the first end of the tube.

4. The method of claim 1 further comprising:
    providing a second end of the tube.

5. The method of claim 4 further comprising:
    loading a second brazing ring on the second end of the tube having a channel of flux exposed toward an outer surface of the second end of the tube; and,
    causing a binder in the exposed flux of the second brazing ring to partially activate and adhere to the outer surface of the second end of the tube.

6. The method of claim 5 wherein the step of causing the binder in the exposed flux of the second brazing ring to partially activate and adhere to the outer surface of the second end of the tube comprises:
    applying a second layer of solvent to the second end of the tube.

7. The method of claim 6 wherein the step of applying a second layer of solvent to the second end of the tube comprises:
    applying acetone to the second end of the tube.

8. The method of claim 1 wherein the step of causing the binder in the exposed flux of the first brazing ring to partially activate and adhere to the outer surface of the first end of the tube comprises:
    applying a first layer of a solvent with a binder to the first end of the tube.

9. The method of claim 5 wherein the step of causing the binder in the exposed flux of the second brazing ring to partially activate and adhere to the outer surface of the second end of the tube comprises:
    applying a second layer of a solvent with a binder to the second end of the tube.

* * * * *